US011881810B2

(12) United States Patent
Stuphann

(10) Patent No.: US 11,881,810 B2
(45) Date of Patent: Jan. 23, 2024

(54) FRAME OF A MODULE FOR A MODULAR PHOTOVOLTAIC SYSTEM, MODULE PRODUCED THEREWITH AND MODULAR PHOTOVOLTAIC SYSTEM

(71) Applicant: Helmut Stuphann, Hofstetten (AT)

(72) Inventor: Helmut Stuphann, Hofstetten (AT)

( * ) Notice: Subject to any disclaimer, the term of this patent is extended or adjusted under 35 U.S.C. 154(b) by 125 days.

(21) Appl. No.: 17/754,399

(22) PCT Filed: Oct. 7, 2020

(86) PCT No.: PCT/AT2020/060354
§ 371 (c)(1),
(2) Date: Mar. 31, 2022

(87) PCT Pub. No.: WO2021/068015
PCT Pub. Date: Apr. 15, 2021

(65) Prior Publication Data
US 2022/0345077 A1 Oct. 27, 2022

(30) Foreign Application Priority Data
Oct. 7, 2019 (AT) .................................. 50844/2019

(51) Int. Cl.
*H02S 30/10* (2014.01)
*H02S 20/23* (2014.01)
(52) U.S. Cl.
CPC .............. *H02S 30/10* (2014.12); *H02S 20/23* (2014.12)
(58) Field of Classification Search
USPC ................................................ 136/243–265
See application file for complete search history.

(56) References Cited

U.S. PATENT DOCUMENTS

2010/0162641 A1\* 7/2010 Reyal ...................... F24S 25/40
52/173.3

FOREIGN PATENT DOCUMENTS

| CH | 708859 A2 | 5/2015 |
| CN | 101603344 A | 12/2009 |
| CN | 104320050 A | 1/2015 |
| CN | 205545120 U | 8/2016 |
| DE | 202009005145 U1 | 10/2009 |

OTHER PUBLICATIONS

International Search Report, dated Dec. 22, 2020, from PCT/AT2020/060354 filed Oct. 7, 2020.

\* cited by examiner

*Primary Examiner* — Bach T Dinh
(74) *Attorney, Agent, or Firm* — Workman Nydegger

(57) ABSTRACT

A module frame includes two longitudinal, and two transverse, frame elements. A longitudinal cover fold, with two longitudinal cover fold end areas, extends from the first longitudinal frame element. A transverse cover fold has two transverse cover fold end areas. The second longitudinal cover fold, and second transverse cover fold, end areas, form a cover fold end area. The bottom surface of the longitudinal cover fold is the height of the top surface of the second longitudinal frame element. The bottom surface of the transverse cover fold is the height of the top surface of the second transverse frame element. The bottom surface of the first transverse cover fold end area is the height of the top surface of the first longitudinal cover end area, and the bottom surface of the cover fold end area is the height of the top surface of the first transverse cover end area.

20 Claims, 6 Drawing Sheets

FRAME OF A MODULE FOR A MODULAR PHOTOVOLTAIC SYSTEM, MODULE PRODUCED THEREWITH AND MODULAR PHOTOVOLTAIC SYSTEM

The present application is a U.S. National Stage of International Application No. PCT/AT2020/060354, filed on Oct. 7, 2020, which claims priority to Austria Patent Application No. A 50844/2019 filed Oct. 7, 2019. All of the aforementioned applications are incorporated herein in their respective entireties by this reference.

The invention relates to a frame of a module for a modular photovoltaic system according to the preamble of claim 1. The invention further relates to a module for a modular photovoltaic system having a frame and a functional element arranged within the frame. The invention finally relates to a modular photovoltaic system, which may be assembled from a plurality of photovoltaic modules.

Rooftop areas of residential buildings are especially suited for the application of solar energy systems, wherein the solar energy systems are configured either to convert solar energy into thermal energy by means of thermal solar elements or to convert solar energy by means of photovoltaic modules. In a modular embodiment of the solar energy systems as photovoltaic systems, there are in general assembled individual photovoltaic modules on a rooftop area into a photovoltaic system, wherein such photovoltaic systems may be mounted on flat roofs as well as on inclined rooftop areas. In particular in the case of inclined rooftop areas, the photovoltaic system may be established either as an on-roof system or as an in-roof system.

While in the case of on-roof systems, the photovoltaic system is mounted on a substructure attached at the roof, with in-roof systems the individual modules of the photovoltaic system are integrated into the roof.

In this regard, the in-roof systems, in contrast to on-roof systems, have the advantage that there is being saved roofing material during construction, whereby costs for the roof covering may be significantly reduced. Furthermore, in-roof photovoltaic systems in comparison to on-roof photovoltaic systems are aesthetically more attractive, as they do not require any ostentatious subconstruction, on which the photovoltaic system is mounted, but rather replace only a part of the roof covering and, hence, in a harmoniously manner integrate into the overall appearance of the roof.

With mounting systems of in-roof photovoltaic systems, the individual modules are usually arranged in several superimposed, horizontally extending rows, wherein the rows extend in an overlapping manner from the roof ridge to the roof eaves.

Such a system has been known, for example, from the patent application US 2018/0254738. In the document there is disclosed a system for mounting photovoltaic roof tiles, wherein the photovoltaic roof tiles are configured such that they serve as roof tiles if being placed on a roof of a building, whereby the building is protected against weathering. According to a variant disclosed in the document, the photovoltaic roof module may also include several spacers. There may be positioned a respective spacer between a first photovoltaic roof tile and an adjacent photovoltaic roof tile, which mechanically connects the first photovoltaic roof tile and the adjacent photovoltaic roof tile. The spacer may be realized, for example, as an extruded section, or the gaps between neighbouring plates may be filled with grouting material in order to form a connection between the neighbouring plates.

From a further patent application US 2014/0069482 there have been known solar roof tiles, which comprise a substrate and a solar module applied onto the substrate, wherein the solar roof tiles have arcuate cover surfaces configured to contact the cover surface of the neighbouring solar roof tile.

Systems having been commercially available for in-roof photovoltaic systems so far, however, have the disadvantage that the mounting thereof is rather cumbersome. This has several reasons.

On the one hand side, it is necessary with the mounting systems available so far to connect the individual modules arranged next to one another by way of additional connecting elements such as, for example, extruded sections or grouting material in a dense way in order to prevent the accumulation of water in-between the individual modules by providing the discharge of the water. Using these additional connecting elements, however, will give rise to additional effort when mounting the in-roof photovoltaic system.

On the other side, with systems available so far, for modules overlapping each other the joints between the photovoltaic modules have to be sealed in a complex way in order to prevent the entry of water, in particular to the sensitive electric and electronic components of the modules.

Common photovoltaic modules have the disadvantage of a complex production, or they are often composed of a plurality of different components, respectively, which merely due to their diversity will render the production of the modules more expensive and in addition have to be assembled in a highly time-consuming manner. There are also often used complex production methods such as deep drawing.

From the CH 708 859 A2 there have been known section elements for attaching photovoltaic modules. A first section element is realized in the form of a hollow section open at both sides, which has at a first end at least one support area as well as a chute and at a second end an attachment groove. A second section element for attaching photovoltaic modules is realized in the form of a hollow section open at both sides, which has at a first end at least one support area and a cover element, wherein the cover element has an engagement leg at the surface facing the second end of the hollow section. In addition, there are provided corner module having a complex configuration, which are required for connecting the section elements and for preventing the entry of rainwater. A solar system comprises several first section elements, a second section element and a photovoltaic module, which rest on the support areas of the first section elements and of the second section elements and which is glued thereto. An in-roof or on-roof solar system assembly comprises several solar systems, wherein the engagement leg of the second section element of a first solar system engages the chute of a first section element of a second solar system and wherein this first section element is arranged on the surface of the second solar systems, which is opposite to the second section element. This system is disadvantageous due to the large number of different components, of which the solar system is composed of, as well as due to the complexity of these components. Also mounting such a complicated solar system on building roofs is considered difficult.

For this reason, there is still demand of systems made of modular photovoltaic modules and photovoltaic modules on the basis of a frame, which may be produced and mounted in a simple and cost-efficient way. A further requirement of a photovoltaic module system is that the module may be arranged next to one another in a plane on the roof to maintain the construction on the roof as low as possible and to meet architectural requirements and to prevent the disadvantages given when mounting common modular photovoltaic systems, the modules of which cover each other in the way of roof tiles.

The present invention solves the tasks posed by providing a frame of a module for a modular photovoltaic system having the features of claim 1, a module for a modular photovoltaic system having a frame according to the invention and a functional element arranged within the frame as well as a modular photovoltaic system that may be assembled from these modules. Further aspects are disclosed in the subclaims, the following description and the drawings.

The inventive frame of a module for a modular photovoltaic system is composed of a first and a second longitudinal frame element situated opposite to one another and a first and a second transverse frame element situated opposite to one another, wherein the transverse frame elements are connected to the longitudinal frame elements. The longitudinal frame elements and the transverse frame elements are realized as extruded sections or rolled sections. Starting from the top surface of the first longitudinal frame element there is extended a longitudinal cover fold from the frame, and starting from the top surface of the first transverse frame element there is extended a transverse cover fold from the frame. The longitudinal cover fold has a first longitudinal cover fold end area and a second longitudinal cover fold end area, wherein the transverse cover fold has a first transverse cover fold end area and a second transverse cover fold end area, wherein the first longitudinal cover fold end area and the first transverse cover fold end area are realized to be self-supporting and wherein the second longitudinal cover fold end area and the second transverse cover fold end area are inter-connected to a common cover fold end area, wherein—measured from a support surface of the frame, i.e. from the frame bottom surface—the bottom surface of the longitudinal cover fold is at least at the height of the top surface of the second longitudinal frame element and the bottom surface of the transverse cover fold is at least at the height of the top surface of the second transverse frame element. The frame according to the invention is characterized in that the bottom surface of the self-supporting transverse cover fold end area is at least at the height of the top surface of the self-supporting longitudinal cover end area and the bottom surface of the common corner area of the cover fold is at least at the height of the top surface of the self-supporting transverse cover fold end area.

It is to be noted that the terms "longitudinal" and "transverse" as used in this document are to be interpreted only as geometrical definitions rather than dimensional specifications. This means that, for example, the longitudinal frame elements may be of equal or shorter length than the transverse frame elements. In general, the frame is realized to be rectangular or square, but for specific applications there may also be provided geometries deviating therefrom, e.g., the form of a rhombus or a parallelogram.

By way of this specific frame construction, modules produced therefrom may be arranged side-by-side and in a support surface on the roof or within a wall of a building and may be inter-connected by means of the cover fold such that the connection of the neighbouring modules will be sealed across the cover fold thereof and no water will enter into the space between the modules.

Due to the realization of the frame elements from extruded sections, the frame may be produced particularly easily, for example by trimming the extruded sections to the required lengths and by connecting the same by way of respective connecting means such as screws or brackets, or by means of soldering or bonding. As an alternative to extruded sections, the frames may also be produced from rolled sections.

For a plurality of applications and for a simple mounting there is preferred that the longitudinal cover fold extends across the entire length of the first longitudinal frame element and that the transverse cover fold extends across the entire length of the first transverse frame element, wherein the longitudinal cover fold and the transverse cover fold are inter-connected in the common corner area. The connection of the longitudinal cover fold and of the transverse cover fold in the common corner area may be realized, for example, by soldering, bonding, crimping, etc. The longitudinal cover fold and the transverse cover fold in the common corner area may further be trimmed flush, in particular mitred, or arranged in an overlapping way.

For an improved prevention of water entering the space between neighbouring modules on the basis of the frame according to the invention there is provided in one embodiment of the invention that at the top surface of the first or second longitudinal frame element or at the bottom surface of the longitudinal cover fold there are arranged gaskets and/or that at the top surface of the first or second transverse frame element or at the bottom surface of the transverse cover fold there are arranged gaskets.

It also serves to improve sealing that at the top surface of the second longitudinal frame element across the length thereof there is extended at least one groove and/or at least one ridge and at the bottom surface of the longitudinal cover fold across the length thereof there are extended ridges and/or grooves mirror-inverted to the grooves or ridges, respectively, of the second longitudinal frame element. Alternatively or additionally, there may be provided that at the top surface of the second transverse frame element across the length thereof there is extended at least one groove and/or at least one ridge and at the bottom surface of the transverse cover fold across the length thereof there are extended ridges and/or grooves mirror-inverted to the grooves or ridges, respectively, of the second transverse frame element.

In order to produce the frame elements on an industrial scale it is advantageous that the longitudinal cover fold be realized to be integral with the first longitudinal frame element and/or the transverse cover fold be realized to be integral with the first transverse frame element.

In practice, a photovoltaic system according to the invention is composed of a plurality of modules based on the frames according to the invention, which are arranged in several rows adjacently to one another, i.e. in a matrix made from columns and rows. The arrangement of the modules is realized, as is the case with roof covering, from the bottom to the top by arranging initially the first (lowest) row from the right to the left side, whereupon the second row is then arranged from the right to the left side and so on up to the uppermost row. If the longitudinal cover folds of the frames are situated at the opposite side of the frames, then arrangement of the rows is realized from the left to the right side.

In order to enable the inter-connection of frames adjacently arranged of a column with just a few turns by way of assembly in a reliable way an embodiment of the invention provides that there is realized in the external wall of one of the two transverse frame elements a protrusion and that in the external wall of the other of the two transverse frame elements there is realized a depression or a hole, wherein the protrusion of the one transverse frame element is situated opposite to the depression or the hole, respectively, of the other transverse frame element and the depression or the hole, respectively, has at least the same dimension as the protrusion.

In order to join modules of a row, there is further provided that there is formed in the external wall of one of the two longitudinal frame elements a protrusion and that there is arranged in the external wall of the other of the two longitudinal frame elements a depression or a hole, wherein the protrusion of the one longitudinal frame element is situated opposite to the depression or the hole, respectively, of the other longitudinal frame element and that the depression or the hole, respectively, has at least the same dimensions as the protrusion. There is to be noted, however, that the modules of one row cannot be simply shifted onto the frames of the neighbouring column in the same row if the neighbouring longitudinal frame element is provided with ridges at the surface thereof or if the frame to be shifted on is provided at the bottom surface of the longitudinal cover fold thereof with ridges. In order for the assembly in this case being functional, there is further provided that the depression be realized as a curved or inclined channel or that the hole be realized as a curved or inclined oblong hole and that preferably the protrusion tapers towards the free end thereof. In this way, the neighbouring frames of the same row may be joined in a movement that is realized in an inclined or curved way.

One aspect of the frame according to the invention is that the bottom surfaces of the longitudinal frame elements and of the transverse frame elements are situated in a common plane forming a support surface.

In order to being able to arrange neighbouring frames at a high packing density, the external lateral walls of the longitudinal frame elements and of the transverse frame elements should be configured for a side-by-side arrangement of several frames.

Due to the rigidity, the low price and the industrial producibility thereof it is preferred that the longitudinal frame elements and the transverse frame elements are composed of aluminium or of a preferably fibre-reinforced plastic material.

In a preferred embodiment of the frame according to the invention there is formed a recess within the self-supporting first end area of the longitudinal cover fold. If several frames are arranged next to one another, this recess serves to cover the inter-connected frames against water flowing upwards, which may occur in the case of strong wind with rain.

In order to being able to compensate material stretching of the frames due to high temperature variations, as will inevitably occur at roofs, there are provided distances between partial areas of the frames. In order to shift such distances for material stretching at the frame inwards up to a gasket, it is preferable if there is realized a recess in the self-supporting first end area of the transverse cover fold.

A module according to the invention for a modular photovoltaic system comprises a frame according to the embodiments described above and at least one functional element arranged within the frame, wherein the frame has a holder, at which the functional element is attached in a sealing manner. According to a preferred embodiment the holder is configured of ridges, as a U-profile, as a tubular profile or as a flat sealing surface, in which the functional element is accommodated. The functional element may be a photovoltaic element, on the one side, and it may also be selected from a cover plate, a decorative element, an aeration element, an element having at least one aperture, a window element, a bargeboard element and/or a roof ridge element. In this way, the functional element may in an advantageous manner be selected according to its purpose and may be inserted into the holder of the frame even before assembly of the module, which provides for high flexibility for the assembly on the roof and further significantly reduces the working time to be spent.

A modular photovoltaic element according to the invention may be assembled from a plurality of modules described above, wherein at least one of the modules has a functional element in the form of a photovoltaic element. In this way, the photovoltaic system may reduce at least a part of a roof covering or also the entire roof covering by forming at least a part of the roof or even the entire roof from modules thus designed, wherein the modules may represent a combination of photovoltaic elements, decorative elements, cover plates, aeration elements, elements having an aperture, window elements, bargeboard elements and/or roof ridge elements, providing for high flexibility in the design of the roof-top surface. The photovoltaic system according to the invention may be excellently integrated into a roof covering by the modules being arrangable side-by-side and the bottom surfaces of the frames forming a support surface resting in a plane on a roof subconstruction. In this way, there is prevented the usual "roof tile arrangement" of modules, in which one module partially superimposes another one.

The invention is explained in the following in greater detail by way of exemplary embodiments in reference to the drawings. In the drawings.

Figure 1:
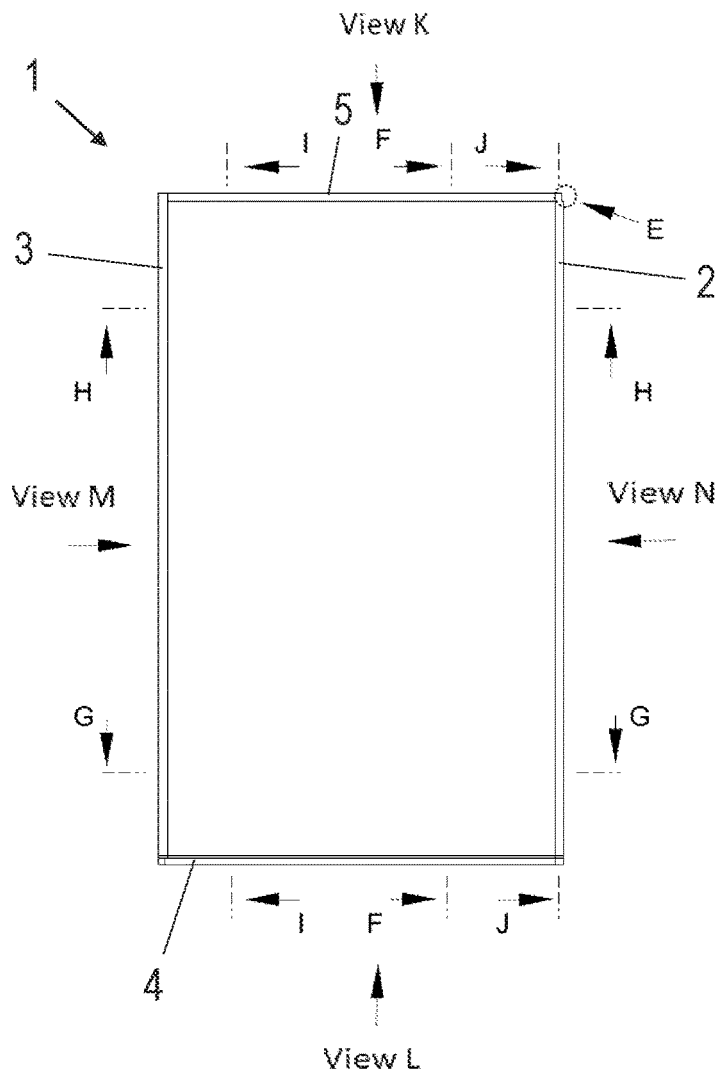
FIG. 1 shows a frame according to the invention in a top view.
Figure 2:
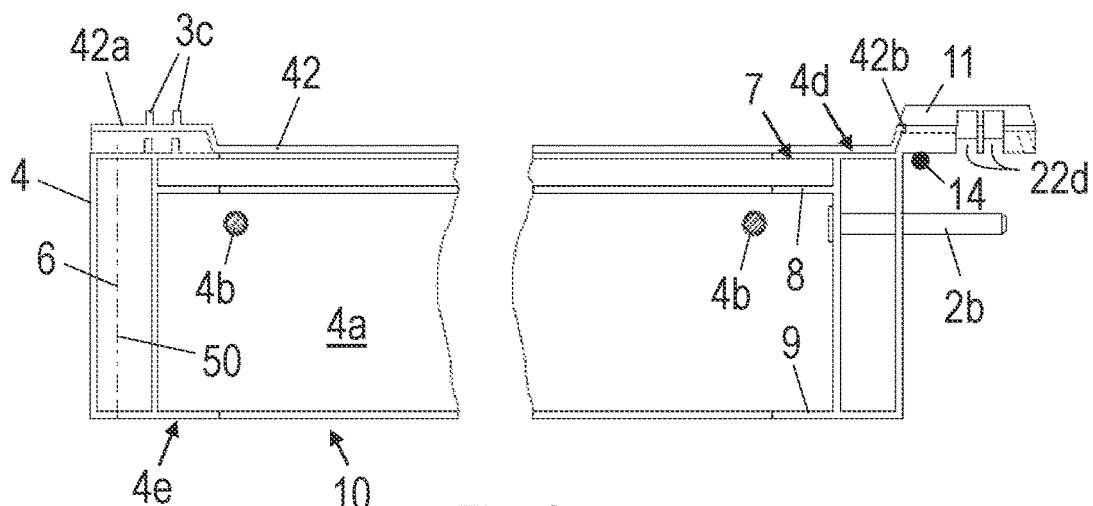
FIG. 2 shows a partially cut side view of the frame in the direction of the arrow L of FIG. 1, with view onto the external surface of the first transverse frame element.
Figure 3:
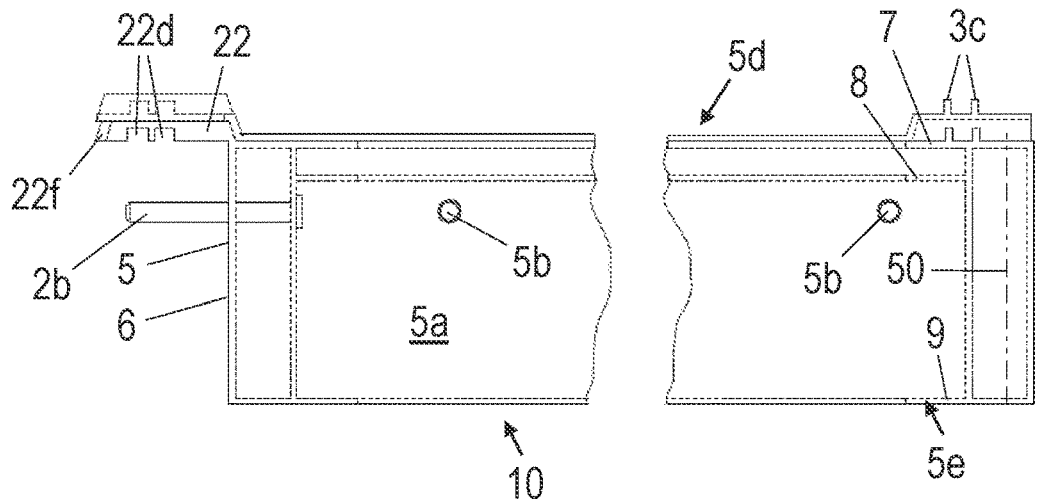
FIG. 3 shows a partially cut side view of the frame in the direction of the arrow K of FIG. 1, with view onto the external surface of the first transverse frame element.
Figure 4:
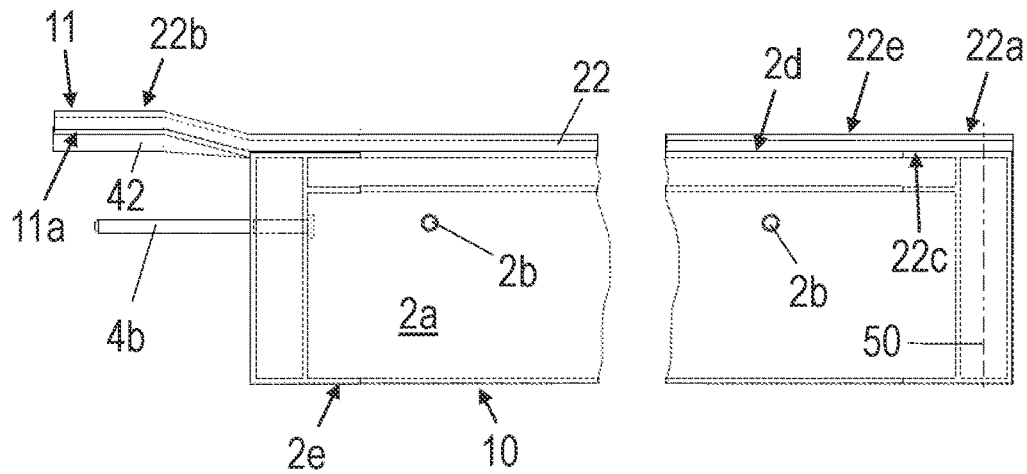
FIG. 4 shows a partially cut side view of the frame in the direction of the arrow N of FIG. 1, with view onto the external surface of the first longitudinal frame element.
Figure 5:
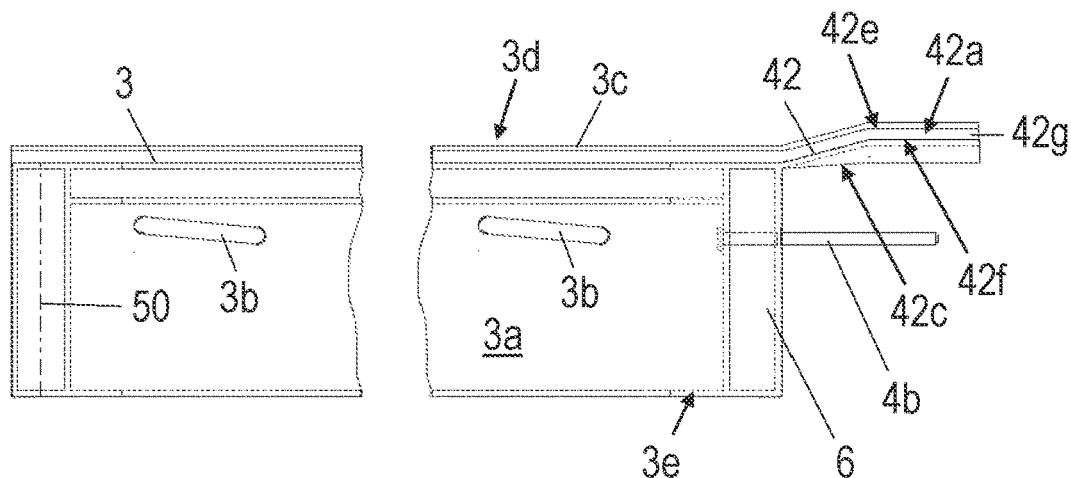
FIG. 5 shows a partially cut side view of the frame in the direction of the arrow M of FIG. 1, with view onto the external surface of the second longitudinal frame element.
Figure 6:
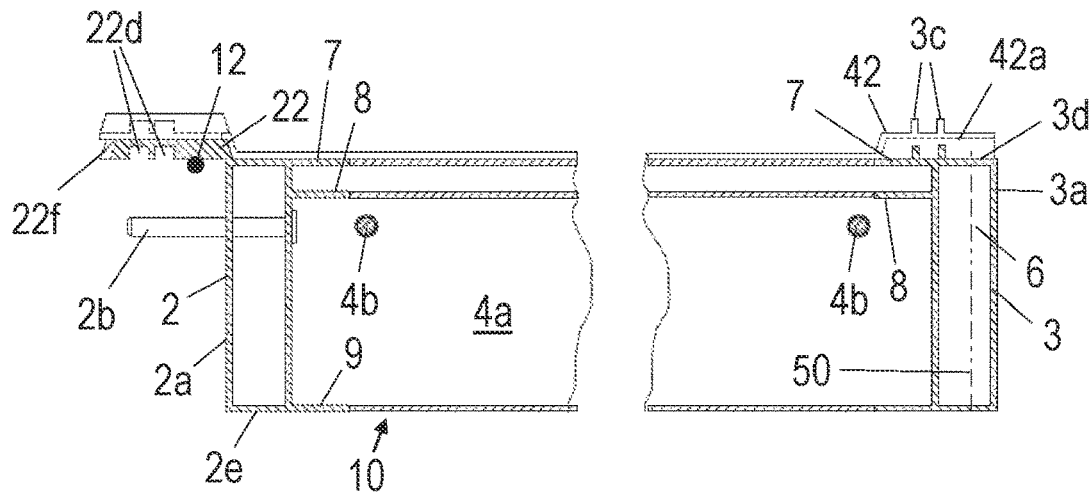
FIG. 6 shows a partial cross-sectional view of the frame along the line G-G of FIG. 1, with view onto the internal surface of the first transverse frame element.
Figure 7:
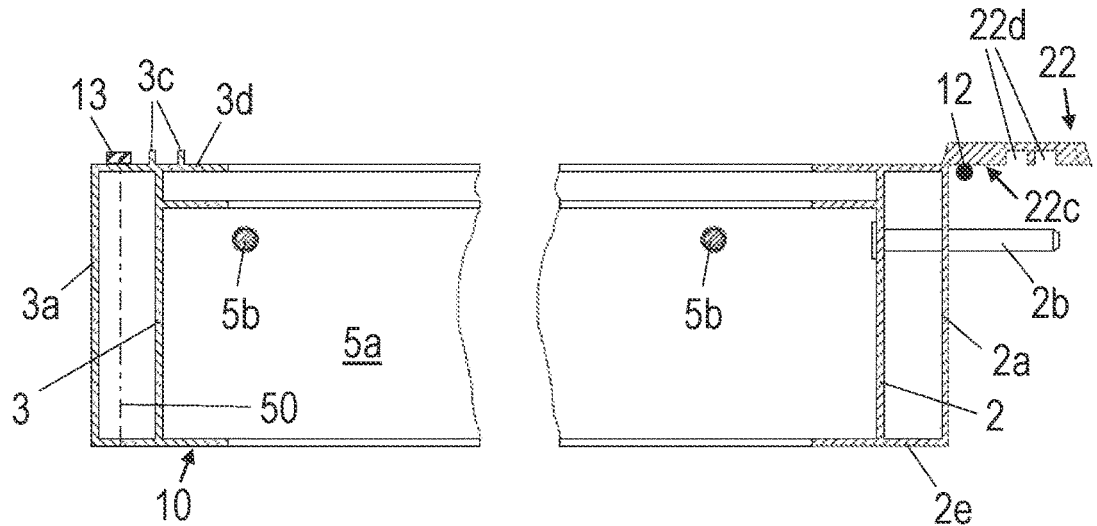
FIG. 7 shows a partial cross-sectional view of the frame along the line H-H of FIG. 1, with view onto the internal surface of the second transverse frame element.
Figure 8:
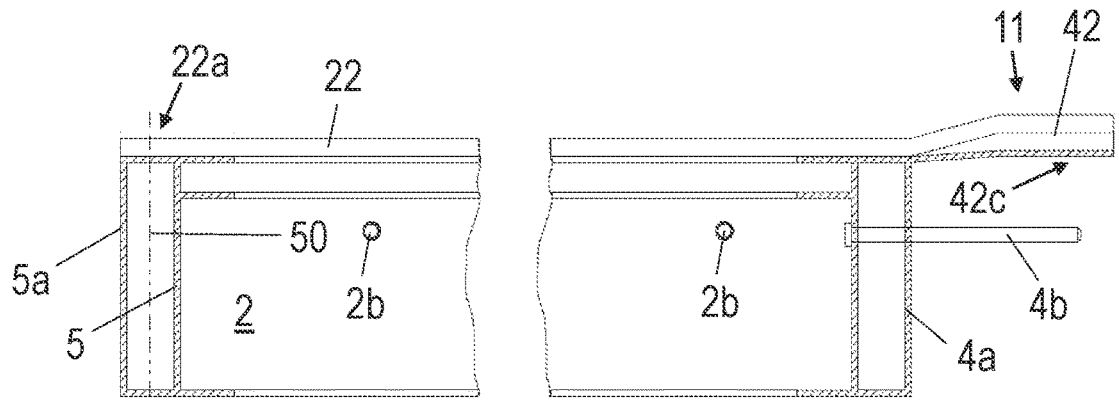
FIG. 8 shows a partial longitudinal view of the frame along the line F-F of FIG. 1, with view onto the internal surface of the first longitudinal frame element.
Figure 9:
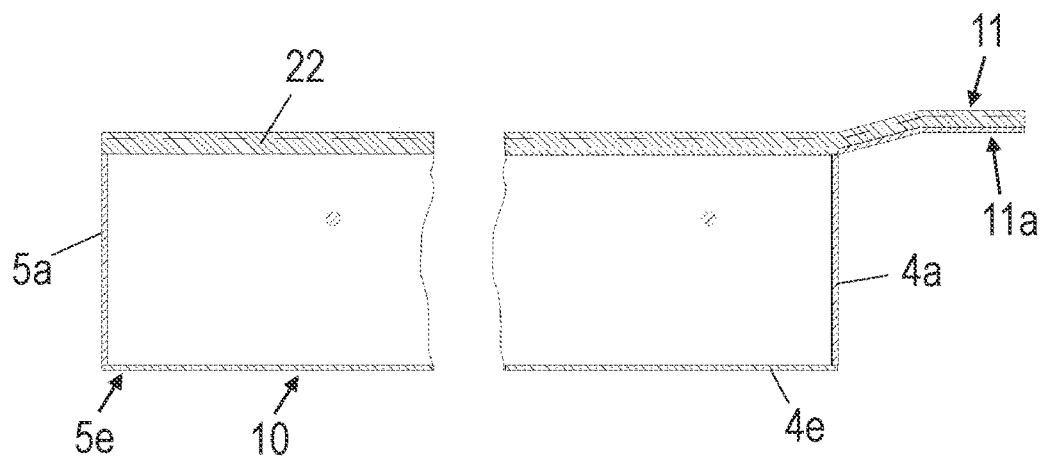
FIG. 9 shows a partial longitudinal view of the frame along the line J-J of FIG. 1 through the first longitudinal frame element.

Initially, there is made reference to the FIGS. 1-10, which show a frame 1 according to the invention of a module for a modular photovoltaic system in various views and sections. The frame 1 is composed of a first and a second longitudinal frame element 2, 3 situated opposite to each other and a first and a second transverse frame element 4, 5 situated opposite to each other. The transverse frame elements 4, 5 are connected at the corners thereof to the longitudinal frame elements 2, 3 such that they form a rectangle. The longitudinal frame elements 2, 3 and the transverse frame elements 4, 5 are realized as extruded sections, in particular made from aluminium or a preferably fibre-reinforced plastic material. Each extruded section has—in a cross-sectional view—a hollow body 6, in this exemplary embodiment a rectangular hollow body 6, which conveys rigidity against bending and twisting to the transverse frame elements 4, 5 and the longitudinal frame elements 2, 3. Starting from the hollow body 6, ridges 7, 8 extend from the top surface thereof and near to the top surface thereof across the length of the longitudinal frame elements 2, 3 and of the transverse frame elements 4, 5 inwards. These ridges 7, 8 are intended to sealingly accommodate functional elements, in particular photovoltaic elements, but also functional elements, which are selected from cover plates, decorative elements, cover plates, aeration elements, elements having at least one aperture, window elements, bargeboard elements and/or roof ridge elements. Starting from the bottom surface of the hollow body 6 of the extruded section, there are extended ridges 9 running across the length of the longitudinal frame element 2, 3 and of the transverse frame elements 4, 5 inwards, which together with the bottom surface of the hollow body of the extruded section form a support surface 10 of the frame 1. The external lateral walls 2a, 3a, 4a, 5a of the longitudinal frame elements 2, 3 and of the transverse frame elements 4, 5 are realized for a side-by-side arrangement of several frames 1.

Starting from the top surface 2d of the first longitudinal frame element 2, a longitudinal cover fold 22 extends from the frame 1 outwards across the length of the first longitudinal frame element 2. The longitudinal cover fold 22 has a first longitudinal cover fold end area 22a and a second longitudinal cover fold end area 22b. Starting from the top surface 4d of the first transverse frame element 4, a transverse cover fold 42 extends from the frame 1 outwards. The transverse cover fold 42 has a first transverse cover fold end area 42a and a second transverse cover fold end area 42b. The first longitudinal cover fold end area 22a and the first transverse cover fold end area 42a are realized to be self-supporting. The second longitudinal cover fold end area 22b and the second transverse cover fold end area 42b are inter-connected to a common cover fold end area 11, wherein—measured from the support surface 10—the bottom surface 22c of the longitudinal cover fold 22 is at least at the height of the top surface 3d of the second longitudinal frame element 3 and the bottom surface 42c of the transverse cover fold 42 is at least at the height of the top surface 5d of the second transverse frame element 5. The bottom surface 42f of the self-supporting first transverse cover fold end area 42a is at least at the height of the top surface of the self-supporting first longitudinal cover end area 22a. The bottom surface 11a of the common cover fold end area 11 is at least at the height of the top surface 42e of the self-supporting first transverse cover fold end area 42a. The longitudinal cover fold 22 is preferably realized to be integral with the first longitudinal frame element 2. Also preferably, the transverse cover fold 42 is realized to be integral with the first transverse frame element 4. Attachment screws 50 are drawn in the figures as a dotdashed line. The position of the attachments screws 50 in the frames 1 is such that in the assembled position they are covered by frames 1 adjacent to the transverse cover fold 42 and the longitudinal cover fold 22 and are thus not visible. This is advantageous for tightness, optics and costs of the photovoltaic system, as the use of sealing gaskets is not required.

The connection between the second longitudinal cover fold end area 22b and the second transverse cover fold end area 42b to the common cover fold end area 11 may be realized by means of soldering, bonding, crimping, etc. For this purpose, either the second longitudinal cover fold end area 22b and the second transverse cover fold end area 42b could be trimmed, e.g., mitred, such that the cutting edges of these end areas 22b, 42b are situated side-by-side and are tightly inter-connected by way of bonding, soldering, etc. Or the second longitudinal cover fold end area 22b and the second transverse cover fold end area 42b may be arranged in a superimposed and inter-connected manner.

For a high sealing effect, there may be arranged gaskets 12, 13 at the top surface of the first or second longitudinal frame element 2, 3 or at the bottom surface of the longitudinal cover fold 22. Similarly, at the top surface of the first or second transverse frame element 4, 5 or at the bottom surface of the transverse cover fold 42 there may be arranged gaskets 14.

In order to seal neighbouring frames 1 against the entry of water, there are formed at the top surface 3d of the second longitudinal frame element 3 across the length thereof two ridges 3c, and at the bottom surface 22c of the longitudinal cover fold 22 across the length thereof there are extend grooves 22d mirror-inverted to the ridges 3c of the second longitudinal element 3. When connecting the neighbouring frames 1, the ridges 3c engage the grooves 22d, thus forming, one the one side, a labyrinth corridor, through which even water driven by wind cannot flow. On the other side, the grooves 22d form discharges for the little water that might have entered this labyrinth corridor.

Figure 10:
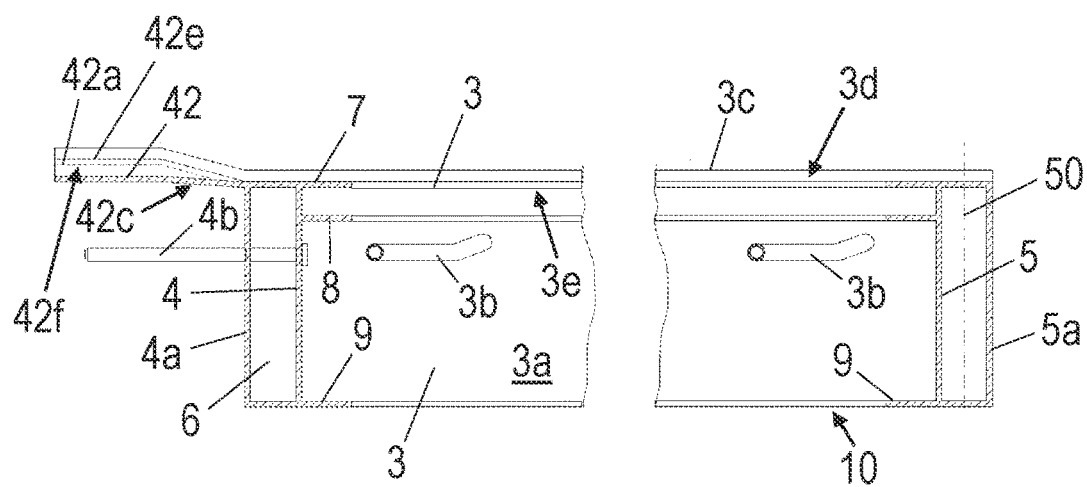
FIG. 10 shows a partial longitudinal view of the frame along the line I-I of FIG. 1, with view onto the internal surface of the second longitudinal frame element.
Figure 11:
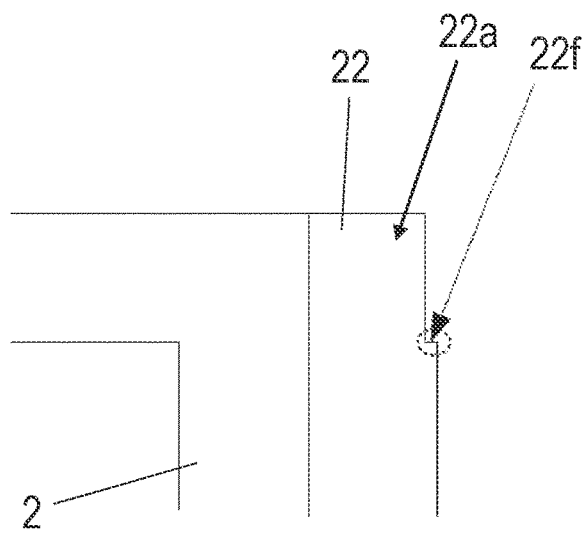
FIG. 11 shows a detail E of the top views of FIG. 1 and FIG. 12.
Figure 15:
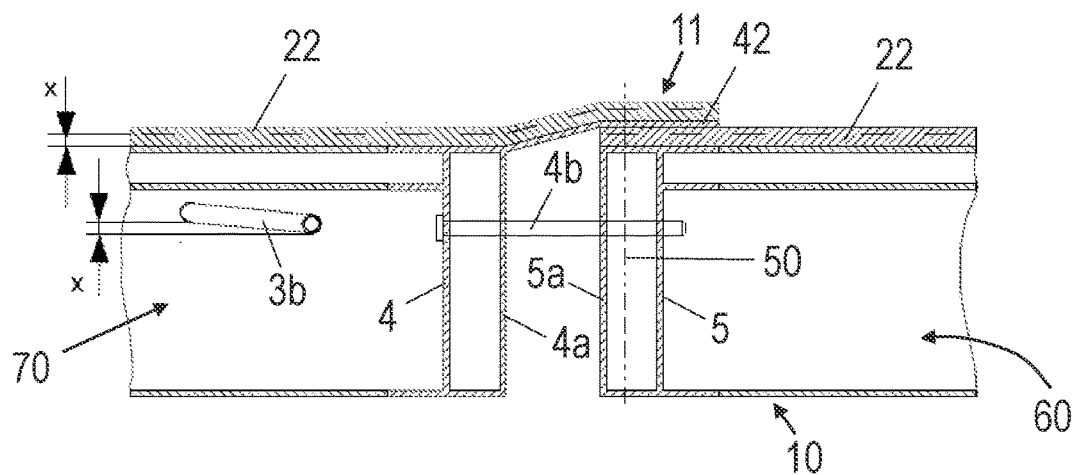
FIG. 15 shows a partial longitudinal view of the photovoltaic system along the line C-C of FIG. 12.

It is provided that neighbouring frames 1 may be inter-connected in the form of a matrix composed of columns and rows, wherein the connection is preferably realized by connecting the frames 1 from the right to the left and from the bottom to the top. This means that there is initially arranged the first (lowermost) row from the right to the left, whereupon the second row is then produced from the right to the left, and so on up to the uppermost row. For this purpose, there are formed in the external lateral wall 2a of the first longitudinal frame element 2 two protrusions 2b in the form of pins and in the external lateral wall 3a of the second longitudinal frame element 3 there are formed holes 3b. The protrusions 2b of the first longitudinal frame element 2 are situated opposite to the holes 3b of the second longitudinal frame elements 3, and the holes 3b are at least of the same dimension as the protrusions 2b. Such that the neighbouring frames 1 may also be joined in a shifting motion, if there are situated ridges 3c at the top surface 3d of the second longitudinal frame element and if there are situated grooves 22d at the bottom surface 22c of the longitudinal cover fold 22, there is provided that the holes 3b be realized as curved and/or inclined oblong holes, wherein the height distance x at the beginning and at the end of the oblong hole is at least of the same size as the height of the ridges 3c or the grooves 22d, respectively, (see FIG. 15). In FIG. 10, the hole 3b is, for example, realized as an oblong hole having a bend. This embodiment presents the preferred embodiment. The pin-like protrusion 2b preferably tapers towards the free end thereof in order to facilitate the introduction of the protrusion 2b into the hole 3b.

In order to have the frames 1 joined in a column of the matrix arrangement, there is formed in the external lateral wall 4a of the first transverse frame element 4 a protrusion 4b in the form of a pin. In the external wall 5a of the second transverse frame element 4 there is further formed a hole 5b. The protrusion 4b of the first transverse frame element 4 is situated opposite to the hole 5b of the second transverse frame element 5. The hole 5b is of at least the same dimension as the protrusion 4b.

In order to prevent at the common corner of four joined frames 1 the entry of water flowing upwards into the corner, there is formed in the self-supporting first end area 22a of the longitudinal cover fold 22 a recess 22f. In the self-supporting first end area 42a of the transverse cover fold 42 there is further realized a recess 42g, whereby a distance y to be provided (see FIG. 13) for material stretching of the frame 1 may be shifted inwards.

The features of the frame 1 make it possible to interconnect frames 1 side-by-side in a matrix arrangement in a support surface 10, thereby ensuring that no water will enter the space between the frames 1. The concept of the frames 1 is based on the fact that the four corner areas of the frame 1 are of different heights such that upon assembly of four frames 1 in two columns and two rows the neighbouring frames 1 will overlap each other in the common corner area of these four frames on four different levels. The lowest level, which more or less represents a reference level, is formed by the top surface 3d of the second longitudinal frame element 3 and the top surface 5d of the second transverse frame element 5, wherein especially the common corner area of the second longitudinal frame element 3 and of the second transverse frame element 5 is of relevance. The second level is defined by the self-supporting first longitudinal cover fold end area 22a, which is at a higher height than the top surface 3d, 5d of the second longitudinal frame element 3 and of the second transverse frame element 5. Above this second level, there is provided as a third level the self-supporting first transverse cover fold end area 42a. The fourth level, which is the highest level, is formed by the common cover fold end area 11. The various levels may be realized by offsetting the respective parts or portions, respectively, of the frame 1.

Figure 12:
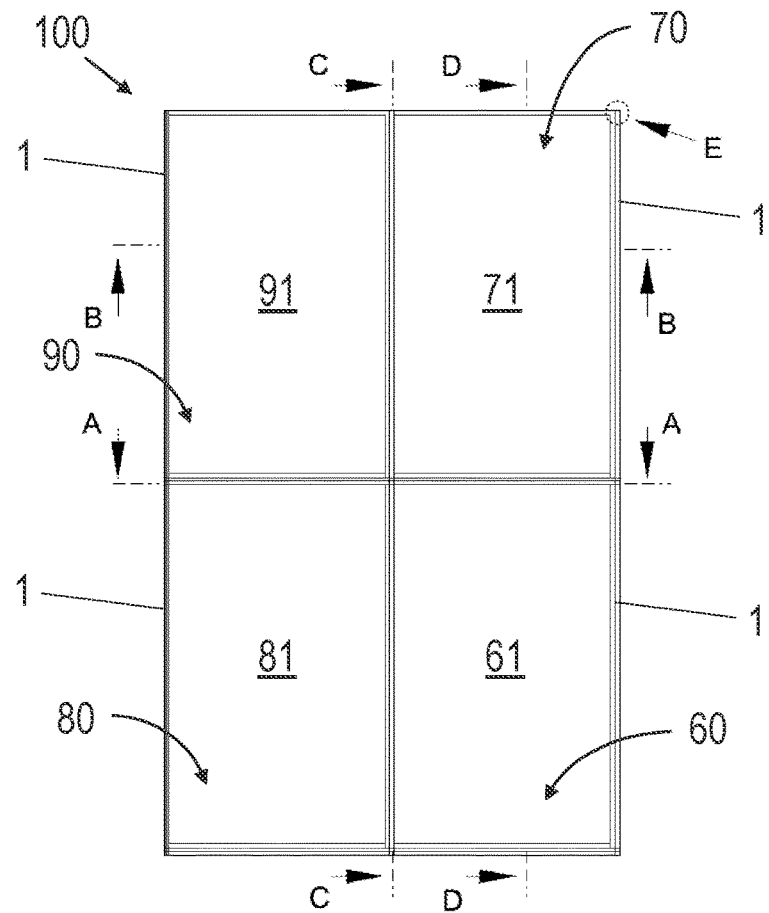
FIG. 12 shows a top view of a modular photovoltaic system according to the invention with four modules each having a frame and a functional element.
Figure 16:
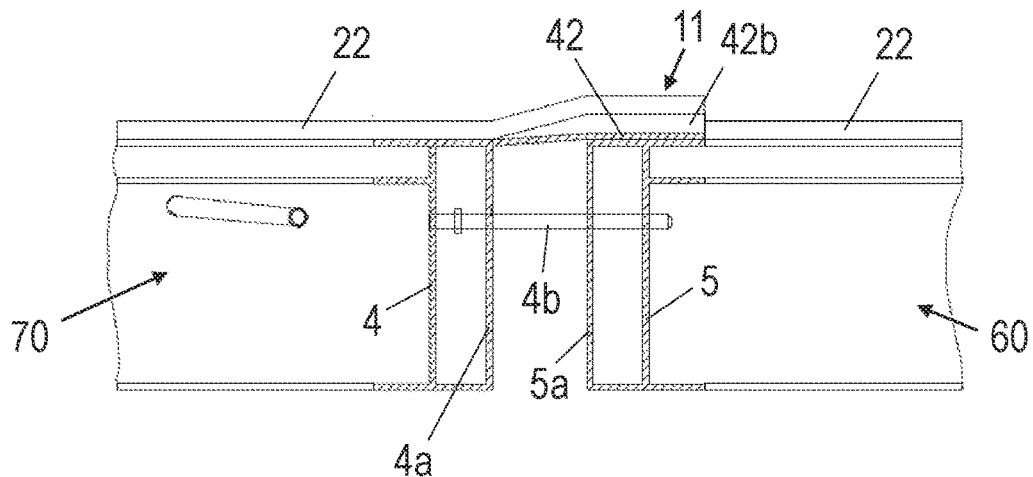
FIG. 16 shows a partial longitudinal view of the photovoltaic system along the line D-D of FIG. 12.

A modular photovoltaic system 100 according to the invention having modules 60, 70, 80, 90, which each comprise a frame 1 and functional elements 61, 71, 81, 91, is in the following explained by way of the FIGS. 12 and 16 to illustrate the concept of a water-tight overlapping of the modules 60, 70, 80, 90 by means of the frames 1 thereof. As far as frame parts are depicted in the FIGS. 12 to 16 and indicated via a reference, there is additionally made reference to the depictions of the FIGS. 1 to 11 and referred to the explanations of these frame parts given above in order to avoid any repetitions, wherein the same references will designate the same parts. The functional elements 61, 71, 81, 91 of the modules 60, 70, 80, 90 are attached in holders, which are composed of the interior ridges 7, 8 of the frames 1. In combination with the hollow body 6 of the extruded section, from which the frames 1 are made, this results in a U-profile enclosing the edges of the functional elements 61, 71, 81, 91. The functional elements 61, 71, 81, 91 are, on the one hand-side, photovoltaic elements, they may, however, also be selected from a cover plate, a decorative element, an aeration element, an element having at least one aperture, a bargeboard element and/or a roof ridge element.

Figure 13:
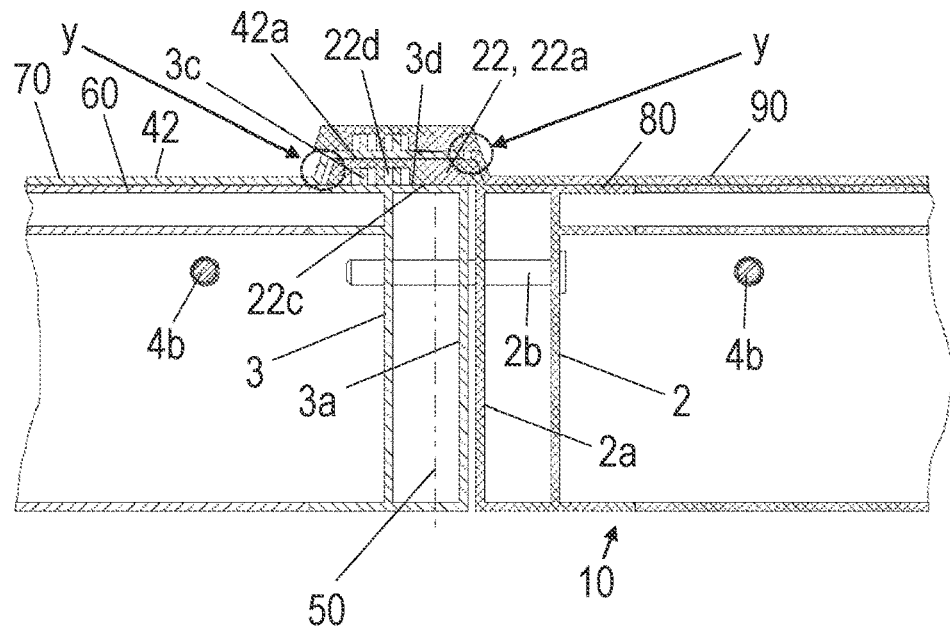
FIG. 13 shows a partial cross-sectional view of the photovoltaic system along the line A-A of FIG. 12.
Figure 14:
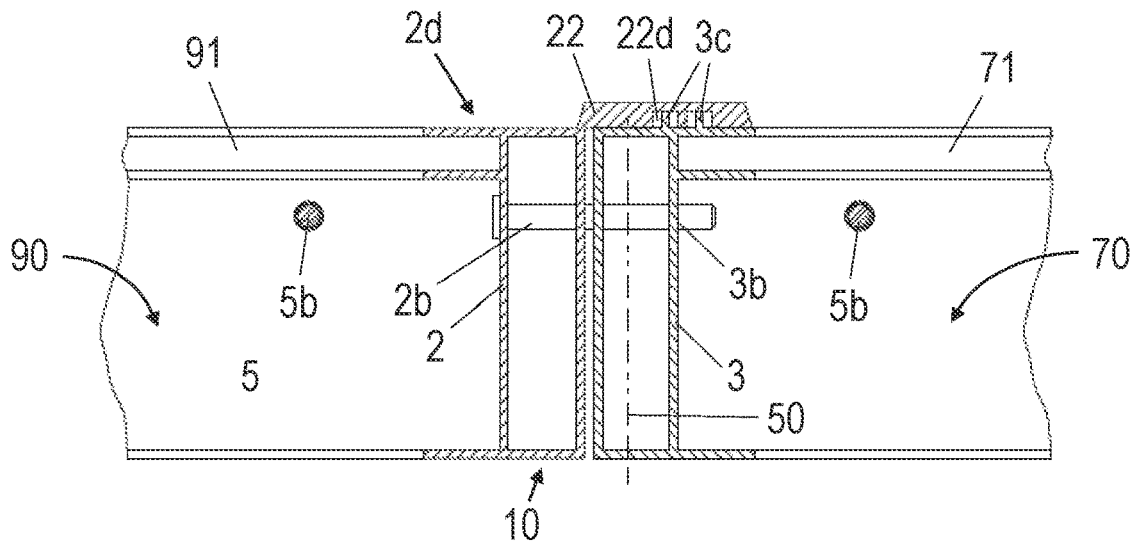
FIG. 14 shows a partial cross-sectional view of the photovoltaic system along the line B-B of FIG. 12.

The photovoltaic system 100 depicted as example in the FIGS. 12 to 16 comprises four modules 60, 70, 80, 90. The photovoltaic system 100 is assembled by initially placing the first module 60 on a base such as a roof subconstruction and then mounting it. Then the second module 70 is arranged above the first module 60 such that the second transverse frame element 5 of the first module 60 and the first transverse frame element 4 of the second module 70 are situated side-by-side and the transverse cover fold 42 of the second module 70 covers the second transverse frame element 5 of the first module 60. For a secure connection, the protrusion 4b of the first transverse frame element 4 of the second module 70, which is realized as a pin, engages the hole 5b of the second transverse frame element 5 of the first module 60. Next, the third module 80 is introduced into the photovoltaic system 100 by arranging it next to the first module 60 (in FIG. 12 left to the first module 60) such that the second longitudinal frame element 3 of the first module 60 is situated side-by-side next to the first longitudinal frame element 2 of the third module 80 and such that the protrusions 2b (pins) of the external lateral wall 2a of the first longitudinal frame element 2 of the third module 80 engage the oblong holes 3b in the external lateral wall 3a of the second longitudinal frame element 3 and the longitudinal cover fold 22 of the third module 80 covers the second longitudinal frame element 3 of the first module 60. Then the third module 80 is shifted downwards into its final position, in which the ridges 3c engage at the top surface 3d of the second longitudinal frame element 3 of the first module 60 the grooves 22d formed at the bottom surface 22c of the longitudinal cover fold 22 of the third module 80. Finally, the fourth module 90 is arranged next to the second module 70 and above the third module 80 and, similarly to the second and third module 70, 80 described above, shifted such that the longitudinal cover fold 22 of the fourth module 90 in its final position covers the second longitudinal frame element 3 of the second module 70 and the transverse cover fold 42 of the fourth module 90 covers the second transverse frame element 5 of the third module 70. As is best visible in FIGS. 13 and 15, portions of all four modules 60, 70, 80, 90 are superimposed in the common corner area of the four modules 60, 70, 80, 90. Due to the configuration of the frames 1, however, also this common corner area of the four modules 60, 70, 80, 90 is impermeable against the entry of water. FIG. 13 shows at the very bottom the module 60 (in the drawing to the left). There are visible the second longitudinal frame element 3 thereof and the external lateral wall 3a of the second longitudinal frame element 3 as well as the ridges 3c situated on the top surface 3d of the second longitudinal frame element 3. To the right of the module 60, there is arranged the module 80. There is visible the first longitudinal frame element 2 thereof with the external lateral wall 2a thereof and the longitudinal cover fold 22 with grooves 22d at the bottom surface 22c thereof. The longitudinal cover fold 22 of the module 80 covers the longitudinal frame element 3 of the module 60. On the left side of FIG. 13, there is visible of the module 70 the transverse cover fold 42, the self-supporting first transverse cover fold end area 42a of which covers the longitudinal cover fold 22 of the module 80. On the right side of FIG. 13, there is visible of the module 90 the common cover fold end area 11, which covers the self-supporting first transverse cover fold end area 42a of the module 70. Distances for material stretching are indicated by the arrows y. In the manner described above it is possible to assemble modular photovoltaic systems 100 of any size. With these photovoltaic systems 100 it is also essential that the modules 60, 70, 80, 90 may be arranged side-by-side and the bottom surfaces of the frames 1 of the modules 60, 70, 80, 90 form a support surface 10 on a roof subconstruction. In this way, contrary to prior art, there may be avoided a "roof tile arrangement", wherein one module with its bottom surface is partially superimposed on the other one.

REFERENCE NUMBERS LIST 1 frame
2 first longitudinal frame element
2a external lateral wall of the first longitudinal frame element
2b protrusion (pin) in the external lateral wall of the first longitudinal frame element
2d top surface of the first longitudinal frame element
2e bottom surface of the first longitudinal frame element
3 second longitudinal frame element
3a external lateral wall of the second longitudinal frame element
3b hole (oblong hole, inclined or curved) in the external lateral wall of the second longitudinal frame element
3c ridge at the top surface of the second longitudinal frame element
3d top surface of the second longitudinal frame element
3e bottom surface of the second longitudinal frame element
4 first transverse frame element
4a external lateral wall of the first transverse frame element
4b protrusion (pin) in the external lateral wall of the first transverse frame element
4d top surface of the first transverse frame element
4e bottom surface of the first transverse frame element
5 second transverse frame element
5a external lateral wall of the second transverse frame element
5b hole in the external lateral wall of the second transverse frame element
5d top surface of the second transverse frame element
5e bottom surface of the second transverse frame element
6 hollow body of the extruded section
7,8,9 interior ridges of the extruded section
10 support surface of the frame
11 common cover fold end area
11a bottom surface of the common cover fold end area
12 gasket at the bottom surface of the longitudinal cover fold
13 gasket at the top surface of the second longitudinal frame element
14 gasket at the bottom surface of the transverse cover fold
22 longitudinal cover fold
22a first longitudinal cover fold end area (self-supporting)
22b second longitudinal cover fold end area
22c bottom surface of the longitudinal cover fold
22d groove at the bottom surface of the longitudinal cover fold
22e top surface of the first longitudinal cover fold end area
22f recess in the self-supporting first end area of the longitudinal cover fold
42 transverse cover fold
42a first transverse cover fold end area (self-supporting)
42b second transverse cover fold end area
42c bottom surface of the transverse cover fold
42e top surface of the first transverse cover fold end area
42f bottom surface of the first transverse cover fold end area
42g recess in the self-supporting first end area of the transverse cover fold
50 attachment screw
60 photovoltaic module
61 functional element
70 photovoltaic module
71 functional element
80 photovoltaic module
81 functional element
90 photovoltaic module
91 functional element
100 modular photovoltaic system
x height difference
y distance

The invention claimed is:

1. A frame of a module for a modular photovoltaic system, wherein the frame is composed of a first and a second longitudinal frame element situated opposite to one another and a first and a second transverse frame element situated opposite to one another, wherein the transverse frame elements are connected to the longitudinal frame elements,
wherein the longitudinal frame elements and the transverse frame elements are realized as extruded sections or rolled sections, wherein a longitudinal cover fold extends starting from the top surface of the first longitudinal frame element of the frame and wherein a transverse cover fold extends starting from the top surface of the first transverse frame element of the frame,
wherein the longitudinal cover fold has a first longitudinal cover fold end area and a second longitudinal cover fold end area, wherein the transverse cover fold has a first transverse cover fold end area and a second transverse cover fold end area,
wherein the first longitudinal cover fold end area and the first transverse cover fold end area are realized to be self-supporting and the second longitudinal cover fold end area and the second transverse cover fold end area are inter-connected to a common cover fold end area,
wherein the bottom surface of the longitudinal cover fold is at least at the height of the top surface of the second longitudinal frame element and the bottom surface of the transverse cover fold is at least at the height of the top surface of the second transverse frame element,
wherein the bottom surface of the self-supporting first transverse cover fold end area is at least at the height of the top surface of the self-supporting first longitudinal cover end area and the bottom surface of the common cover fold end area is at least at the height of the top surface of the self-supporting first transverse cover fold end area.

2. The frame according to claim 1, wherein the longitudinal cover fold extends across the entire length of the first longitudinal frame element and that the transverse cover fold extends across the entire length of the first transverse frame element, wherein the longitudinal cover fold and the transverse cover fold are inter-connected in the common cover fold end area.

3. The frame according to claim 1, wherein there are arranged gaskets at the top surface of the first or second longitudinal frame element or at the bottom surface of the longitudinal cover fold and/or that there are arranged gaskets at the top surface of the first or second transverse frame element or at the bottom surface of the transverse cover fold.

4. The frame according to claim 1, wherein at the top surface of the second longitudinal frame element across the length thereof there are extended at least one groove and/or at least one ridge and that at the bottom surface of the longitudinal cover fold across the length thereof there are extended ridges and/or grooves mirror-inverted to the grooves or ridges, respectively, of the second longitudinal frame element.

5. The frame according to claim 1, wherein at the top surface of the second transverse frame element across the length thereof there is extended at least one groove and/or at least one ridge and that at the bottom surface of the transverse cover fold across the length thereof there are extend ridges and/or grooves mirror-inverted to the grooves or ridges, respectively, of the second transverse frame element.

6. The frame according to claim 1, wherein the longitudinal cover fold is realized to be integral with the first longitudinal frame element and/or that the transverse cover fold is realized to be integral with the first transverse frame element.

7. The frame according to claim 1, wherein there is realized in the external lateral wall of one of the two longitudinal frame elements at least one protrusion and there is realized in the external lateral wall of the other of the two longitudinal frame elements at least one depression or a hole, wherein the protrusion of the one longitudinal frame element is situated opposite to the depression or hole, respectively, of the other longitudinal frame element and that the depression or the hole, respectively, have at least the same dimensions as the protrusion.

8. The frame according to claim 7, wherein the depression is realized as a curved or inclined channel or the hole is realized as a curved or inclined oblong hole and the protrusion tapers towards the free end thereof.

9. The frame according to claim 1, wherein in the external lateral wall of one of the two transverse frame elements there is realized at least one protrusion and in the external wall of the other of the two transverse frame elements there is realized at least one depression or a hole, wherein the protrusion of the one transverse frame element is situated opposite to the depression or the hole, respectively, of the other transverse frame element and the depression or the hole, respectively, has at least the same dimension as the protrusion.

10. The frame according to claim 1, wherein the bottom surfaces of the longitudinal frame elements and of the transverse frame elements are situated in a common plane, which forms a support surface.

11. The frame according to claim 1, wherein the external lateral walls of the longitudinal frame elements and of the transverse frame elements are realized for a side-to-side arrangement of several frames.

12. The frame according to claim 1, wherein the longitudinal frame elements and the transverse frame elements are composed of aluminium or a fibre-reinforced plastic material.

13. The frame according to claim 1, wherein in the self-supporting first end area of the longitudinal cover fold there is realized a recess.

14. The frame according to claim 1, wherein in the self-supporting first end area of the transverse cover fold there is realized a recess.

15. The module for a modular photovoltaic system, comprising a frame according to claim 1 and at least one functional element arranged within the frame, wherein the frame has a holder, at which the functional element is attached in a sealing manner.

16. The module according to claim 15, wherein the holder is realized as ridges, as a U-profile, as a tubular profile, or as a flat sealing surface, in which the functional element is accommodated.

17. The module according to claim 15, wherein the functional element is a photovoltaic element.

18. The module according to claim 15, wherein the functional element is selected from a cover plate, a decorative element, an aeration element, an element having at least one aperture, a window element, a bargeboard element and/or a roof ridge element.

19. A modular photovoltaic system, wherein the modular photovoltaic system is assembled from a plurality of modules according to claim 15, wherein at least one of the modules has a functional element in the form of a photovoltaic element.

20. The photovoltaic system according to claim 19, wherein the modules are arranged side-to-side so that the bottom surfaces of the frames of the modules form a support surface.

* * * * *